Sept. 27, 1966 D. A. SCHROEDER 3,275,486

METHOD OF REMOVING INSULATING MATERIAL FROM ELECTRICAL CONDUCTORS

Filed July 19, 1963

INVENTOR
DUANE A. SCHROEDER
BY
Kemon, Palmer, Stewart & Estabrook
ATTORNEYS

United States Patent Office 3,275,486

Patented Sept. 27, 1966

3,275,486

METHOD OF REMOVING INSULATING MATERIAL FROM ELECTRICAL CONDUCTORS

Duane A. Schroeder, East Dundee, Ill., assignor to Methode Electronics, Inc., Chicago, Ill., a corporation of Illinois Filed July 19, 1963, Ser. No. 296,224
3 Claims. (Cl. 156—3)

This invention relates to the removal of insulating material from electrical conductors and particularly to the removal of the encapsulation from the thin, foil-like conductors in flexible wiring units. Such units consist of a multiplicity of thin metallic bands interposed between sheets of a resinous dielectric. Either the metal receives a special treatment to increase its adhesion to the dielectric, or the resin is so chosen that the metal is very strongly bonded to the resin. Each conductive element is insulated and encapsulated by the resinous sheath. The delicacy of the conducting elements and the highly adhesive bonding which exists between the conductor and the resin makes it extremely difficult to attach conductor terminals to the unit or to form individual contacts at intermediate points.

Although suitable resins are thermoplastic, they are usually highly crystalline. Hence, the temperature difference between their softening points and their melting points is very small. It is the usual experience that the resin cannot be melted off and removed from the ends of the cable without softening adjacent areas so much that scraping the melt from the foils results in tangling or at least displacement of the delicate conductors adjacent the terminal.

Washing the resin off with an effective solvent also is highly unsatisfactory. If a solvent is to remove areas of resin it must at once solvate and penetrate the resin. Usually it will be found that the solvent will wick into the resin, swell it, and form a softened bead so that a clear, sharp line where the encapsulation ceases and the conductors are exposed cannot be secured. In consequence, the most usual present-day practice is to grind or abrade the resinous material away from the contact area. This is an operation of exceeding delicacy. The feeding rate against the grinding wheel must be most carefully controlled, otherwise the resin will soften, stick to the wheel, and tear off the ends of the conductors; and, since the conductors themselves are exceedingly thin, great care must be exercised as the grinding wheel abrade the resin, to prevent cutting away of the metal. Although the operation is effective, it can in no sense be considered a production procedure.

I have discovered that when the encapsulating resin is a polyester, i.e. polyethylene terephthalate and like material derived from ethylene oxide, terephthalic acid, and isophthalic acid and the conductive foils are metallic copper, it is possible to remove the encapsulating material from the conductors in such a way that a clean, sharp line is formed between the exposed conductors and the remainder of the flexible wiring unit. The operation lends itself well to quantity production, is expeditious, and can be performed without danger of breaking or displacing any of the exposed conductive foils.

It is well known that polyesters may be hydrolized by strong acids or by caustic. It is also known that hot, concentrated sulfuric acid is a vigorous oxidizing agent and reacts strongly with copper and lead. My invention depends upon the fact that these two reactions i.e. hydrolysis of the polyester and oxidation of the metal proceed at distinct and separate reaction rates, the hydrolizing of the polyester progressing so rapidly that a reasonable encapsulating thickness of polyester is completely destroyed before, as a practical matter, oxidative attack on the metal begins.

In consequence of this rate difference, I find it possible to mask the polyester effectively with a ductile sheet of lead and then dip the exposed and intended contact area of the wiring unit into hot, concentrated sulfuric acid. After an immersion of one minute in 1.84° Bé. $H_2SO_4$, at 220° F., the exposed polyester will completely disappear. The attack on the lead mask, although noticeable at this temperature will not have reached destructive limits. The attack on copper conductors, although it may be chemically demonstrated, is during the minute, so exceedingly small that it has neither electrical nor mechanical significance.

Other common, strong acids will destroy the polyester, but the time between the complete destruction of the polyester and deleterious acid attack on the conductive foil is not favorable. Whereas, with sulfuric acid, the two effects are sufficiently separated in time to allow accurate and reproducible control of the stripping operation, the times overlap in the case of i.e. nitric acid. In consequence, when other acids are employed, removal of the polyester without harming the copper foil ranges from tricky to impossible.

The lead mask is held in place by a synthetic rubber based pressure sensitive, adhesive coating. The coated side of the mask is pushed into firm contact with the encapsulation and then pressed or rolled lightly to assure overall contact. The ductility of the lead permits the tape to be folded tightly and neatly about the margins of the wiring unit so that, in the case of attaching a multiple connector to the end of the unit, an adherent collar of lead surrounds the unit leaving only so much of the end exposed as will be soldered to the connector.

The time required to remove the polyester depends both on acid concentration and temperature. Concentrations ranging from 1.53° to 1.84° Bé. and temperatures ranging from room temperature to the boiling point of the acid may be used. For industrial purposes, the lower ranges are too slow; the high range is not easily controllable. Best operation will be secured with acid concentrations of 1.53° to 1.84 Bé. at temperatures of about 200 to about 220° F.

The destruction of the polyester is accelerated if an acid- and heat-stable wetting agent is added to the sulfuric acid. Suitable materials, a number of which are commercially available, include Petrowet-R and Zonyl-A, manufactured by E. I. du Pont de Nemours and Co. Zonyl-A is a modified alkyl polyethyleneglycol. Petrowet-R is a saturated hydrocarbon sodium sulfonate.

If the acid contains a wetting agent, a polyester encapsulation 11 mils thick will be removed in approximately one minute, under the above conditions. Without the wetting agent, the removal time will be increased 20 to 30%. After removal from the acid, washing, and removal of the lead tape, the exposed copper foils will be clean and sharp, for the acid does not penetrate the polyester beneath the lead mask.

One-sided or single spot removal of the polyester may also be secured. An aperture is formed in the mask which otherwise completely covers so much of the unit as will be flooded with acid. Just as soon as the copper foil is exposed, the unit is removed from the acid.

Adhesion of the reverse side of the foil is not affected. It remains securely bonded to the polyester back.

Figure 1:
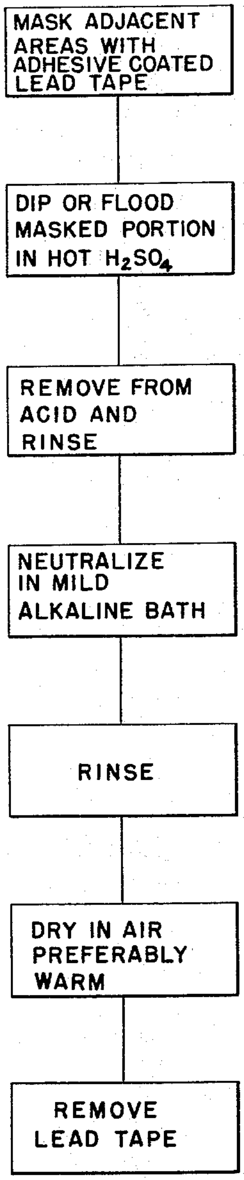
FIG. 1 is a block diagram illustrating the successive steps.
Figure 2:
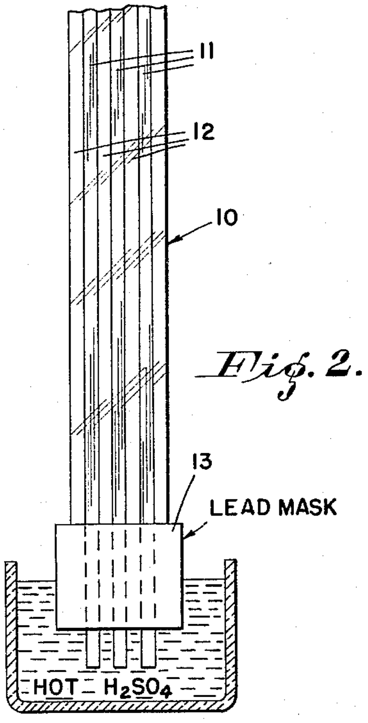
FIG. 2 is a diagrammatic representation of the removal of polyester from the end of the wiring strip.
Figure 3:
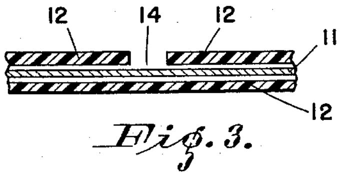
FIG. 3 is an enlarged, exploded cross-section showing polyester removed from one side only at the wiring unit.
Figure 4:
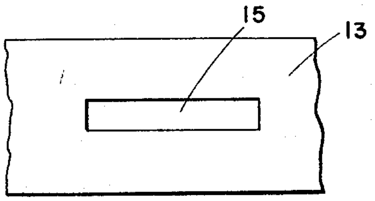
FIG. 4 is a plan view of the apertured lead mask used in producing the wiring unit of FIG. 3.

The reference numbers on FIGS. 2, 3, and 4 of the drawing have the following significance:

A wiring unit is shown at 10, having encapsulated copper conductors 11, each insulated and surrounded by the polyester 12. The position of the lead mask (when end terminals are to be applied) is shown at 13.

In FIG. 3, the gap 14 in the polyester 12, is that formed when the acid reaches the polyester through the cut-out 15 (FIG. 4) in the lead mask 13.

EXAMPLE I

*(Stripping the ends for application of a multiple connector)*

A mask of adhesive coated lead tape 2 inches wide (Type Y 19053 manufactured by Minnesota Mining & Mfg. Co.) was folded about a wiring unit having 10 conductors 2 mm. wide and 3 mils thick. The total thickness of the polyester encapsulation was 0.011 inch.

The margin of the tape was laid at right angles to the margin of the unit ½ inch from its end.

The tape was rolled into intimate contact with the polyester covering and its ends were overlapped slightly. The masked end of the unit was then dipped in $H_2SO_4$ of 1.84° Bé. concentration containing 2 weight percent of "Zonyl-A" as a wetting agent at a temperature of 220° F. At the end of one minute, the unit was removed from the acid, rinsed in water, and then dipped in a neutralizing solution of sodium bicarbonate. The unit was again rinsed and dried in a current of warm air (circa 140° F.). After drying, the lead tape was removed, a connector was applied and each contact was soldered to the copper tabs protruding beyond the margin of the polyester.

All exposed copper was clean, bright, and showed no sign of acid attack. The polyester was removed completely—beyond a clean, straight, knife-like margin previously established by the lead mask.

EXAMPLE II

The general procedure of Example I was followed except that a mask was provided having a rectangular cut-out as shown at 15 (FIG. 4). The linear dimension of the cut-out was the transverse outside dimension of the ten conductors (4.8 cm.). The width was 6 mm. The tape was laid transversely across the unit at a point intermediate between its ends. The ends of the cut-out were registered with the outer margins of the outermost conductors. The area exposed by the cut-out was then flooded with $H_2SO_4$ of 1.53 Bé. concentration at 200° F. After 50 seconds the unit was rinsed in water and then neutralized and dried as in Example I. The top surface only of the conductors was exposed. The polyester lying beneath the plane of the top surface of the conductors was intact and each conductor was securely bonded to the underlying polyester.

EXAMPLE III

A single contact point was formed in a wiring unit by following the procedure of Example II with the exception that a hole 2.5 mm. in diameter was punched in the mask.

This hole was centered over one conductor and instead of dipping or flooding the area in acid, hot acid was directed into the hole through a pipette.

A round hole was formed in the covering layer of polyester and connection was made to the exposed copper.

When the process is conducted as has been disclosed, it is simple, quick, and inexpensive. The scrap-loss which plagues mechanical removal of the polyester is almost completely avoided.

What is claimed is:

1. The process of removing polyester insulating material from copper conductive elements of a flexible wiring unit leaving a clean, sharp end margin on the remaining polyester material which comprises:

(A) masking an area of a flexible wiring unit formed by copper conductive elements encapsulated in polyester insulating material adjacent the intended points of electrical contact with lead foil having one of its faces coated with a pressure sensitive adhesive by placing the adhesive surface of the masking foil against the polyester and pressing the foil into intimate contact with the surface of said unit.

(B) flooding the area of polyester to be removed with sulfuric acid having a concentration of between about 1.53 to 1.84° Bé. at a temperature of between 135° F. and the boiling point of the acid, (C) removing the unit from contact with said acid before deleterious attack on the lead and copper begins, (D) neutralizing any adherent acid and drying the unit, and (E) removing the lead mask to provide a flexible wiring unit having clean exposed conductive elements adapted for electrical connection.

2. The process of claim 1 wherein the polyester is polyethylene terephthalate, the acid is sulfuric of from 1.53 to 1.84° Bé. containing about 2 weight percent of a heat and acid stable wetting agent, the temperature of the acid is between 200 and 220° F. and the time of immersion is approximately 1 minute.

3. The process of claim 1 wherein the polyester is removed from one side only of the wiring unit by forming an aperture in the lead foil mask, registering the aperture over the area of the conductor to be exposed, flooding the aperture with hot acid, and removing the acid before the supporting polyester beneath the conductor has been attacked, thereby exposing one side only of the copper conductor.

References Cited by the Examiner

UNITED STATES PATENTS

| | | | |
|---|---|---|---|
| 2,979,387 | 4/1961 | Easley et al. | 156—14 |

FOREIGN PATENTS

| | | |
|---|---|---|
| 730,958 | 6/1955 | Great Britain. |

OTHER REFERENCES

Partington—Textbook of Inorganic Chemistry, page 835, 6th ed., 1957, Macmillan, New York, p. 3, 1950.

Popular Science, May 1947, p. 209, Wire Stripper.

ALEXANDER WYMAN, *Primary Examiner.*

JACOB STEINBERG, *Examiner.*

UNITED STATES PATENT OFFICE
CERTIFICATE OF CORRECTION

Patent No. 3,275,486 September 27, 1966

Duane A. Schroeder

It is hereby certified that error appears in the above numbered patent requiring correction and that the said Letters Patent should read as corrected below.

Column 2, line 58, after "and" insert -- bright. The end margin of the polyester will be clean and --.

Signed and sealed this 22nd day of August 1967.

(SEAL)
Attest:

ERNEST W. SWIDER
Attesting Officer

EDWARD J. BRENNER
Commissioner of Patents